Patented Apr. 11, 1950

2,503,279

UNITED STATES PATENT OFFICE 2,503,279

AZO CATALYSTS IN PREPARATION OF SULFONYL CHLORIDES

William H. Lockwood, Wilmington, Del., assignor to E. I. du Pont de Nemours & Company, Wilmington, Del., a corporation of Delaware No Drawing. Application August 12, 1947, Serial No. 768,265

6 Claims. (Cl. 260—543)

This invention relates to the preparation of aliphatic sulfonyl chlorides and more particularly to the preparation of aliphatic sulfonyl chlorides from saturated hydrocarbons.

The preparation of hydrocarobn sulfonyl chlorides and particularly aliphatic hydrocarbon sulfonyl chlorides from the hydrocarbon and sulfuryl chloride is known. U. S. Patent 2,383,319 discloses a process whereby this reaction is promoted by the employment of a catalyst.

This invention has as an object the preparation of sulfonyl chlorides from saturated hydrocarbons aliphatic in character, i. e. aliphatic or cycloaliphatic, i. e., non-aromatic, by reaction with sulfuryl chloride in the presence of a new catalyst for said reaction and without the necessity of irradiation with actinic light. Another object is an improvement in the process of U. S. Patent 2,383,319. A further object is the provision of a new catalytic process. Other objects will appear hereinafter.

These objects are accomplished by the following invention wherein the hydrocarbon, aliphatic in character and containing a trimethylene, —CH$_2$CH$_2$CH$_2$—, radical is treated with the sulfuryl chloride, to form sulfonyl chloride, aliphatic in character, in the presence of a catalytic amount of an azo compound wherein both valences of the (acyclic) azo, —N=N—, group are attached to different carbons at least one and preferably both of said carbons being tertiary and further bonded to a negative radical, neutral with respect to acidity, through carbon of said radical the three remaining valences of said carbon of said radical are satisfied by oxygen or nitrogen. These neutral negative radicals are the nitrile, —CN, carbonamido, —CONH$_2$, and carbalkoxy, —COOR, groups, R being an alkyl group of one to six carbons. The preferred azo catalysts are symmetrical, having both valences of the acyclic azo, —N=N—, group bonded to tertiary carbons. These are active at lower temperatures. An additional and preferred phase of the invention is that wherein a process according to U. S. 2,383,319 is carried out using not only a catalyst according to said patent but also an azo catalyst as above defined.

The following examples in which parts are by weight are illustrative of the invention.

EXAMPLE I

Into a reaction vessel opaque to light and which was fitted with an agitator, a gas outlet and a means for adding liquid without venting the reaction space was placed 300 parts of a highly paraffinic hydrocarbon fraction boiling between 265° C. and 305° C., free from unsaturated components, and having a specific gravity of 0.801 at 15.5° C. To this were added one part of stearamide, and 5 parts of alpha,alpha'-azodiisobutyronitrile.

The mass was warmed to 63° C. and 405 parts of sulfuryl chloride was added dropwise over a period of two hours. The reaction mass was agitated during this addition and the temperature was maintained at about 65° C. while the water bath surrounding the flask was at 61–63° C. Gaseous hydrogen chloride was evolved during this time. The reaction mass was stirred at 65° C. for a further 45 minutes and was found to have gained 148 parts. The mixture of aliphatic sulfonyl chlorides and unreacted oil was then hydrolyzed in 225 parts of 30% aqueous sodium hydroxide solution at 90–95° C. The resultant mass, 667 parts, was diluted with 1334 parts of water and 104 parts of ethyl alcohol and separated at 65° C. into two layers, one of 1980 parts, of aqueous solution and the other, of 140 parts, of unreacted oil. The aqueous solution analyzed 12.06% sodium aliphatic sulfonate and 1.6% unreacted oil showing that approximately 128 parts of hydrocarbon had been converted to the sulfonyl chlorides and then to 239 parts of aliphatic sodium sulfonate by hydrolysis.

While the reaction will take place to some extent in the presence of the azo compound but in the absence of a second catalyst, e. g. stearamide, it is preferred to use an additional catalyst as disclosed in U. S. Patent 2,383,319, i. e. organic compounds containing (a) carbon and nitrogen, (b) carbon, nitrogen and oxygen, (c) carbon and phosphorus, and (d) carbon, nitrogen, oxygen and sulphur are the most effective catalysts and are to be preferred. The tertiary nitrogen ring compounds are a preferred class of the carbon and nitrogen group. Organic compounds containing (a) carbon, nitrogen and sulphur, and (b) carbon and oxygen are less preferred groups of catalysts. Organic compounds containing (a) carbon, oxygen and sulphur and (b) carbon and sulphur are the least preferred groups of catalysts. The stated preferences are not intended to be restrictive since the effectiveness of a group of catalysts varies with the type and nature of the saturated hydrocarbon being converted to a sulphonyl chloride and with the reaction conditions. The following compounds will serve to illustrate the various groups of organic catalysts that may be employed in the practice of this invention:

*Carbon and nitrogen compounds*

Pyridine
Quinoline
Quinaldine
Uns.-dimethylethylenediamine
N,N,N',N'-tetramethylhexamethylenediamine
Nicotine
N-dimethyl-C-dimethylglycinenitrile
Hexamethylenediamine
Alpha-aminopyridine
2,6-diaminopyridine
Phenthroline
Piperidine
Isoquinoline
Octodecylamine
Ethylenediamine
N-dimethyl cyclohexylamine
Dimethylaniline
Tributylamine
Isoamylamine

*Carbon, nitrogen and oxygen compounds*

M-nitrodimethylaniline
Lauramide
N-(p-methoxybenzl) lauramide
Butyrolactam
Tetramethylammoniumformate
N,N'disalicylaldiaminoethane
N-(2-ethylhexanylidine)-2-ethylhexylamine
2-amino-2-methylpropanol-1
Dodecyl carbamate
Xylylheptadecylketoxime
Hexamethylenediisocyanate
N-dimethylmethoxyacetamide
Isobutylundecylenamide
Nicotinic amide
Acetamide
Morpholine
Stearyldimethylamineoxide
Pyridinium acethydrazide

*Carbon and phosphorus compounds*

Triphenylphosphine

*Carbon, nitrogen, oxygen and sulphur compounds*

(Trimethylaminoethylstearate) methyl sulphate

*Carbon, nitrogen and sulphur compounds*

2-mercaptothiazoline
Methallylisothiocyanate
Allylthiourea
Tetramethyl thiuram disulphide
Tetramethyl thiuram monosulphide

*Carbon and oxygen compounds*

Phenylethyleneoxide

*Carbon, oxygen and sulphur compounds*

Anthraquinone-1-sulphonic acid, potassium salt

*Carbon and sulphur compounds*

Thiophenol

Of these, the more important are the amino, amido, nitrilo, phosphino and quaternary ammonium compounds and particularly the fatty acid amides.

In the process of this invention there may be employed as a catalyst for the reaction of sulfuryl chloride with a saturated aliphatic hydrocarbon any azo compound wherein both valences of the (acyclic) azo, —N=N—, group are attached to different carbons at least one and preferably both of said carbons being tertiary and further bonded to a negative radical, neutral with respect to acidity, through carbon of said radical the three remaining valences of said carbon of said radical are satisfied by oxygen or nitrogen. These neutral negative radicals are the nitrile, —CN, carbonamido, —CONH₂, and carbalkoxy, —COOR, groups, R being an alkyl group of one to six carbons. Illustrative azo catalysts include alpha,alpha'-azodiisobutyronitrile, alpha,alpha'-azobis(alpha,gamma-dimethylvaleronitrile), alpha,alpha'-azobis(alpha-ethylbutyronitrile), azodicyclohexanecarbonitrile, azobis(alpha-methylbutyronitrile), alpha,alpha'-azobis(alpha-methylenanthonitrile), ethyl alpha,alpha'-azodiisobutyrate, ethyl alpha,alpha'-azobis(alpha,-gamma-dimethylvalerate), methyl alpha,alpha'-azo-diisobutyrate, hexyl alpha,alpha'-azo-diisobutyrate, azodiisobutyramide, alpha,alpha'-azobis(alpha,gamma-dimethylvaleramide), alpha,alpha'-azobis(alpha,alpha'-cyclopropylpropionitrile). Various of these catalysts are effective at concentrations of from 0.1% to 3% based on the hydrocarbon.

The process of this invention is preferably carried out so that a substantial portion of the hydrocarbon remains unreacted. This is easily done by limiting the amount of sulfuryl chloride used. The extent of the reaction may be judged by the weight gain of the reaction mass or by its specific gravity after removal of sulfuryl chloride. When not more than about half of the hydrocarbon is reacted, the bulk of the sulfonated hydrocarbon is present as the mono-sulfonate which is generally more valuable than the di-sulfonate. As an increasing proportion of the hydrocarbon is reacted, an increasing amount of di- and polysulfonated material is formed at the expense of the mono-sulfonated product. The reaction may be carried out at any temperature between the melting point of the hydrocarbon and the decomposition point, which may range from 80 to 120° C., of the resultant sulfonyl chlorides although usually temperatures between about 0° and 75° C., are preferred. Operation at atmospheric pressure is preferred for convenience. Moderate increase in pressure increases the reaction rate but if this is too high the reaction is difficult to control. The azo catalyst used is preferably one with a rapid decomposition rate at the desired reaction temperature. Pressures of 0.5 to 3 atmospheres are satisfactory although the reaction may be carried out outside these limits.

This invention has a distinct value in the art in that it permits the sulfonylation of saturated hydrocarbons in the dark. Heretofore it has been necessary to provide special equipment which would permit irradiation of the reaction mass with actinic light. This consisted of special vessels built with transparent tubes inserted in the walls or covers or else glass or quartz vessels. In addition it was necessary to provide sources of actinic radiation such as quartz mercury vapor lamps, arc lamps, fluorescent mercury vapor lamps and the like. By using the present invention it is possible to carry out the sulfonylation in conventional standard equipment.

The sulfonated products are of use as surface active agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of hydrocarbon sulfonyl chlorides by the reaction of sulfuryl chloride with a saturated hydrocarbon containing a trimethylene, —CH₂CH₂CH₂—, group and selected from the class consisting of aliphatic hydrocarbons and cycloaliphatic hydrocarbons, the improvement wherein the reaction is conducted in the presence of a catalyst selected from the group consisting of azobis(cyanoalkanes) wherein the cyano group of the cyanoalkyl radical is on tertiary carbon which is attached to azo nitrogen and azobis(cyanocycloalkanes) wherein the cyano group of the cyanocycloalkyl radical is on tertiary carbon which is attached to azo nitrogen.

2. Process of claim 1 wherein a fatty acid amide is present as an additional catalyst.

3. Process of claim 1 wherein stearamide is present as an additional catalyst.

4. In the preparation of hydrocarbon sulfonyl chlorides by the reaction of sulfuryl chloride with a saturated aliphatic hydrocarbon containing a trimethylene, —CH₂CH₂CH₂—, group, the improvement wherein the reaction is conducted in the presence of an azobis(cyanoalkane) wherein the cyano group of the cyanoalkyl radical is attached to tertiary carbon which is attached to the azo nitrogen.

5. In the preparation of hydrocarbon sulfonyl chlorides by the reaction of a saturated aliphatic hydrocarbon containing a trimethylene

—CH₂CH₂CH₂— radical with sulfuryl chloride, the improvement wherein the reaction is conducted in the presence of alpha,alpha'-azobis(isobutyrontrile) and, as an additional catalyst, a fatty acid amide.

6. Process of claim 5 wherein the fatty acid amide is stearamide.

WILLIAM H. LOCKWOOD.

REFERENCES CITED

The following references are of record in the file of this patent:

Annalen, vol. 290, pp. 1 to 43 (1896).